US010264026B2

United States Patent
Barboi et al.

(10) Patent No.: US 10,264,026 B2
(45) Date of Patent: Apr. 16, 2019

(54) PROVIDING PRIVILEGED ACCESS TO NON-PRIVILEGED ACCOUNTS

(71) Applicant: CyberArk Software Ltd., Petach-Tikva (IL)

(72) Inventors: Dima Barboi, Rishon-Lezion (IL); Boris Spivak, Rishon-Lezion (IL); Yair Sade, Herzelia (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 15/658,290

(22) Filed: Jul. 24, 2017

(65) Prior Publication Data

US 2019/0028514 A1 Jan. 24, 2019

(51) Int. Cl.
  *H04L 29/06* (2006.01)
  *H04W 12/06* (2009.01)

(52) U.S. Cl.
  CPC .......... *H04L 63/20* (2013.01); *H04L 63/08* (2013.01); *H04L 63/0807* (2013.01); *H04L 63/10* (2013.01); *H04L 63/102* (2013.01); *H04L 63/108* (2013.01); *H04W 12/06* (2013.01)

(58) Field of Classification Search
  CPC .......... H04L 63/20; H04L 63/08; H04L 63/10
  See application file for complete search history.

(56) References Cited

U.S. PATENT DOCUMENTS

| | | | | |
|---|---|---|---|---|
| 2011/0321147 | A1* | 12/2011 | Chakra | G06F 21/6218 726/9 |
| 2015/0113600 | A1* | 4/2015 | Dulkin | H04L 63/102 726/4 |
| 2015/0121461 | A1* | 4/2015 | Dulkin | H04L 63/1408 726/4 |
| 2015/0180894 | A1* | 6/2015 | Sadovsky | G06F 3/0481 726/22 |
| 2017/0054711 | A1* | 2/2017 | Shen | H04L 63/0838 |
| 2017/0149786 | A1* | 5/2017 | Alon | H04L 63/10 |
| 2017/0223005 | A1* | 8/2017 | Birgisson | H04L 63/08 |

* cited by examiner

Primary Examiner — Baotran N To
(74) Attorney, Agent, or Firm — Finnegan, Henderson, Farabow, Garett & Dunner, LLP

(57) ABSTRACT

The disclosed embodiments include systems and methods for dynamically managing privileged access for non-privileged accounts. Operations may include receiving a request from a computer device associated with a network account to access a privileged resource, wherein the network account lacks any privileged account membership enabling the network account to access the privileged resource. Operations may include authenticating the network account, and assigning, based on the authentication, privileged on-demand membership for the network account, wherein the privileged on-demand membership enables the network account to access the privileged resource. Operations may also include identifying that the network account should no longer have access to the privileged resource, and removing, based on the identification, the privileged on-demand membership for the network account.

24 Claims, 6 Drawing Sheets

PROVIDING PRIVILEGED ACCESS TO NON-PRIVILEGED ACCOUNTS

BACKGROUND

Privileged access credentials are a necessary evil in many organizations. Ideally, privileged credentials are given to the right people, with the right levels of privileged access, are not misused, and are not shared with others who are not supposed to have them. For example, IT administrators may possess certain privileged credentials, executives may possess other privileged credentials, and regular users may possess limited or no privileged credentials. In reality, however, the wrong privileged credentials (e.g., unnecessarily strong credentials) can be given to these people, credentials may be misused, and credentials may be vulnerable to proliferation to other users or machines. When privileged credentials fall into the hands of an attacker, they allow the attacker to take control of an organization's IT infrastructure, disable security controls, steal confidential information, commit financial fraud, and otherwise disrupt operations. Stolen, abused, or misused privileged credentials are involved in a large proportion of network security breaches.

One existing approach for providing privileged credentials in computer networks is to use semi-permanent, hard-coded credentials in applications. Examples of such credentials include passwords, SSH keys, asymmetric (e.g., public/private) keys, symmetric keys, and other types of cryptographic data or privileged security or access tokens. In some situations, these credentials are included within an application or on a machine for use in communicating with other network resources. Because these credentials are accessible in applications or on machines, however, they are vulnerable to theft by malicious entities. If an attacker obtains access to an application or machine with such credentials, the attacker may use the credentials to access other network resources, potentially expanding their freedom of movement throughout the network and compromising more of the network.

A further approach to manage access to privileged credentials is to use a secure vault, which contains privileged credentials and is not accessible to users. In this approach, a user who wants to access a target network resource must authenticate itself to the vault, which in turn supplies the needed privileged credentials to the target network resource without exposing the user to the privileged credentials. This technique thus relies on the use of privileged credentials and privileged accounts, but limits their exposure and visibility to the vault and target network resource, not to the user itself.

It would be advantageous, however, for a technological solution to allow regular, non-privileged accounts to access privileged resources without having to rely on privileged accounts or credentials. For example, it would be advantageous to elevate the privileged access rights for a user (e.g., inclusion in privileged membership lists, modification of an access token, or privileged remote access) on an on-demand and as-needed basis, so that the user has the necessary access rights only for as long as they are needed, and the access rights are thereafter withdrawn. Such techniques would also be advantageous if a user obtains temporary access rights to a privileged resource, since there would be no trace of privileged credentials left behind for attackers to exploit. For example, no credentials would be locally stored on the user's machine, even temporarily, during the process of obtaining elevated access rights. In view of these advantages, there is thus a need for technological solutions for dynamically managing privileged access for non-privileged accounts.

SUMMARY

The disclosed embodiments describe systems and methods for dynamically managing privileged access for non-privileged accounts. In an example embodiment, there may be a server system for dynamically managing privileged access for non-privileged accounts. The system may comprise a memory device storing a set of instructions and a processor configured to execute the set of instructions to receive a request from a computer device associated with a network account to access a privileged resource, wherein the network account lacks any privileged account membership enabling the network account to access the privileged resource. The processor may also be configured to execute the set of instructions to authenticate the network account, and assign, based on the authentication, privileged on-demand membership for the network account, wherein the privileged on-demand membership enables the network account to access the privileged resource. Additionally, the processor may be configured to execute the set of instructions to identify that the network account should no longer have access to the privileged resource, and remove, based on the identification, the privileged on-demand membership for the network account.

According to a disclosed embodiment, the privileged on-demand membership is assigned by an agent running on a machine hosting the privileged resource.

According to a disclosed embodiment, the privileged on-demand membership is assigned by an agent running on a machine separate from the privileged resource.

According to a disclosed embodiment, the assigning of the privileged on-demand membership for the network account is based on a privileged access policy that governs access to the privileged resource.

According to a disclosed embodiment, the privileged access policy includes privileged access rules based on at least one of a user name associated with the network account, a computer name associated with the computer device, application information associated with the privileged resource, time, and location of the computer device.

According to a disclosed embodiment, the identification that the network account should no longer have access to the privileged resource is based on the end of a session of the network account.

According to a disclosed embodiment, the identification that the network account should no longer have access to the privileged resource is based on the privileged access policy.

A disclosed embodiment may also include the identification that the network account should no longer have access to the privileged resource is based on a command to end the network account's access to the privileged resource.

According to a disclosed embodiment, the assigning of the privileged on-demand membership for the network account includes modifying an access token associated with the network account.

According to another disclosed embodiment, the access token identifies the identity and privileges of the network account.

According to another disclosed embodiment, the access token is modified conditional on the authentication of the network account.

According to a further disclosed embodiment, there are a plurality of different levels of privileged on-demand membership for the privileged resource, and the level assigned for the network account is based on the authentication.

According to another disclosed embodiment, there are a plurality of different levels of privileged on-demand membership for the privileged resource, and the level assigned for the network account is based on the privileged access policy.

According to a further disclosed embodiment, there are a plurality of different levels of privileged on-demand membership for the privileged resource, and the level assigned for the network account is based on the access token.

According to another disclosed embodiment, the processor may be configured to execute the set of instructions to intercept the request and assign the privileged on-demand membership before the request can reach the privileged resource.

According to a further disclosed embodiment, the processor may also be configured to execute the set of instructions to intercept the request and assign the privileged on-demand membership after the request reaches the privileged resource.

According to another disclosed embodiment, the processor may be configured to execute the set of instructions to, before assigning the privileged on-demand membership for the network account, open a remote virtualized session with the network account.

According to a further disclosed embodiment, the network account is enabled to access the privileged resource through the remote virtualized session.

According to a further disclosed embodiment, a method may be implemented for dynamically managing privileged access for non-privileged accounts. The method may comprise receiving a request from a computer device associated with a network account to access a privileged resource, wherein the network account lacks any privileged account membership enabling the network account to access the privileged resource. The method may also comprise authenticating the network account, and assigning, based on the authentication, privileged on-demand membership for the network account, wherein the privileged on-demand membership enables the network account to access the privileged resource. The method may further comprise identifying that the network account should no longer have access to the privileged resource, and removing, based on the identification, the privileged on-demand membership for the network account.

According to a further disclosed embodiment, the assigning of the privileged on-demand membership for the network account is based on a privileged access policy that governs access to the privileged resource.

According to another disclosed embodiment, the privileged access policy includes privileged access rules based on at least one of a user name associated with the network account, a computer name associated with the computer device, application information associated with the privileged resource, time, and location of the computer device.

According to a further disclosed embodiment, the identification that the network account should no longer have access to the privileged resource is based on the end of a session of the network account.

According to another disclosed embodiment, the identification that the network account should no longer have access to the privileged resource is based on the privileged access policy.

According to a further disclosed embodiment, the assigning of the privileged on-demand membership for the network account includes modifying an access token associated with the network account.

According to another disclosed embodiment, the access token identifies the identity and privileges of the network account.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
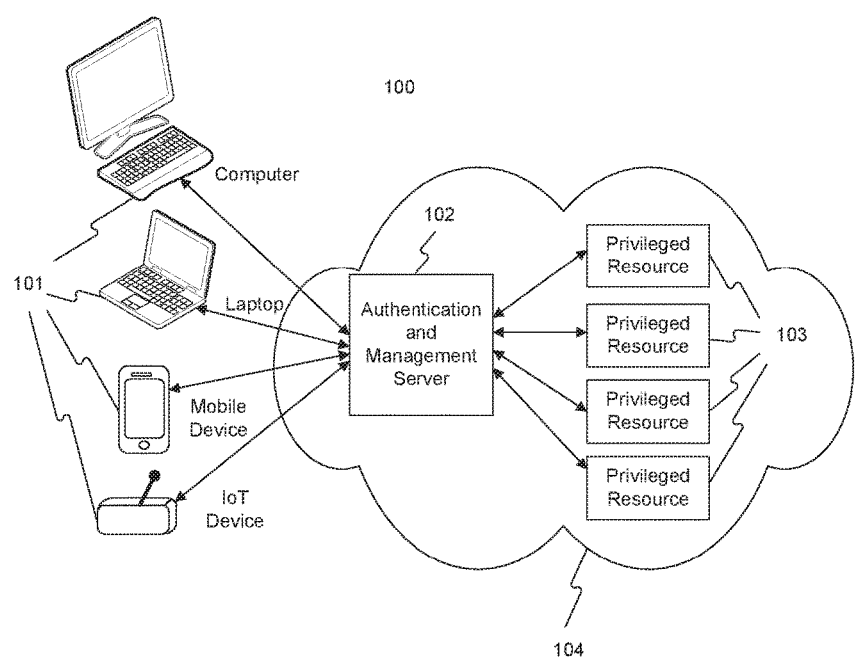
FIG. 1 is a block diagram of an example system, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In the disclosed embodiments, a system may receive a request from a computer device associated with a network account to access a privileged resource. As disclosed herein, a computer device may be any of numerous types of devices with data processing and network communications capabilities. Examples include servers, desktop computers, cloud-computing virtual machines or containers, laptops, smartphones, tablets, personal digital assistants, enterprise digital assistants, smart cards, smart watches, smart bands, smart headphones, computer-embedded clothing, car-computers and other in-vehicle computer equipment, Internet-of-Things (IoT) devices, and any other device with data processing and network connectivity capabilities.

As disclosed herein, a network account may be a user account, machine account, application account, or any other type of account that can be established and associated with a particular user, machine, or application in a computer network. Examples include operating system user accounts (e.g., in Microsoft Windows™, Apple OS™ versions, Linux accounts, etc.), and accounts created for the purpose of running machines or applications (e.g., in a machine-to-machine or application-to-application communications environment). Network accounts may have varying levels of access rights associated with them, ranging from so-called "super-user" accounts with broad access rights (potentially root access privileges), administrator accounts with varying degrees of access rights, executive or VIP accounts with varying degrees of access rights, regular user accounts with generally narrower access rights, and guest or unknown accounts with even less access rights. A network account may be used to access resources distributed in a computer network and additionally or alternatively, may be used to access one or more resources of a local machine or computing device, such as a locally installed application, for example.

In the disclosed embodiments, a privileged resource may be any network resource to which access is limited. Access may be limited, for example, through the requirement that some privileged credential (e.g., password, SSH key, asymmetric (e.g., public/private) key, and other type of cryptographic data or privileged security or access token) be provided and verified before access to the privileged resource is permitted. Examples of privileged resources include SQL servers, databases holding confidential information, restricted-use applications, operating system directory services (e.g., Microsoft Active Directory™), access-restricted cloud-computing resources (e.g., orchestrator software), sensitive IoT equipment (e.g., electricity or other utility equipment, physical access control devices, video surveillance equipment, etc.), and any other computer-based equipment or software accessible to a limited group of users on a network. In some embodiments, a privileged resource may be a locally installed resource managed based on local access rights associated with a local computer group, for example.

In accordance with the disclosed embodiments, some network accounts (e.g., non-privileged network accounts) may lack any privileged account membership enabling them to access a privileged resource. If the network account is authenticated, however, it may be assigned privileged on-demand membership enabling it to access the privileged resource. As disclosed herein, privileged on-demand membership may involve temporarily adding the network account to an appropriate domain/local security group on the privileged resource. Further, privileged on-demand membership may involve temporarily modifying an access token (e.g., Microsoft™ access token) or other security object associated with the network account and the process (e.g., instance) used to access a resource. As discussed further below, privileged on-demand membership may be withdrawn or revoked upon a particular event (e.g., end of a session, detection of improper network account activity, etc.), based on expiration of an allowed time period, or based on various other policy settings.

As described herein, network accounts, computer devices, or users may be authenticated before privileged on-demand membership may be granted. Authentication may broadly take several forms, such as verification of passwords, SSH keys, asymmetric (e.g., public/private) keys, symmetric keys, Kerberos tickets, Docker signed tags, and other types of cryptographic data or privileged security or access tokens. Further, the authentication may be based on white/black lists for devices or device addresses, or biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication). Further, as discussed below, the authentication may be performed on the computer device, on a remote authentication server, or through a combination of functionality of both.

Reference will now be made in detail to the disclosed embodiments, examples of which are illustrated in the accompanying drawings.

FIG. 1 is a block diagram of an example system 100 for dynamically managing privileged access for non-privileged accounts consistent with the disclosed embodiments. As shown, system 100 includes a plurality of computer devices 101. In addition to the examples of a computer, laptop, mobile device, and IoT device 101 shown in system 100, a variety of other types of computer devices are possible too, such as tablets, personal digital assistants, enterprise digital assistants, smart cards, smart watches, smart bands, smart headphones, computer-embedded clothing, car-computers and other in-vehicle computer equipment, and any other device with data processing and network connectivity capabilities. In various embodiments, computer devices 101 may have one or more network accounts that are associated with them, with applications installed on them, or with users who use them.

System 100 may also include an authentication and management server 102, which is configured for communications with computer devices 101 and privileged resources 103. Authentication and management server 102 may be one or more of various types of servers, whether a single server machine, a group of common server machines, or a server farm. As discussed further below, while the authentication and management server 102 may have multiple functions (e.g., authentication, enforcing a policy, and granting privileged on-demand membership for network accounts), these functions may be performed by a single server machine or multiple server machines.

In some embodiments, authentication and management server 102 may be configured to authenticate computer devices 101, network accounts, or users associated therewith before privileged on-demand membership may be granted for network accounts. As discussed above, the authentication may take various forms, such as the verification of passwords or cryptographic data, biometric data, or behavioral data. In further embodiments, authentication and management server 102 does not perform authentication, but instead, as discussed further below, the decision whether to grant privileged on-demand membership for a network account is based on a policy governing such membership.

In addition to performing authentication, or in the alternative, authentication and management server 102 may manage privileged access to privileged resources 103. In some embodiments, this may involve applying a policy to determine whether network accounts seeking to access privileged resources 103 should be granted privileged on-demand membership sufficient for obtaining such access. Depending on whether authentication of computer devices 101, network accounts, or users is performed, the policy may be applied conditional on the result of the authentication (e.g., only if authentication is successful) or irrespective of authentication.

In some embodiments, authentication and management server 102 may perform additional functions such as monitoring of actions performed by privileged users. Other additional functions may include, for example, support of various workflows, such as managerial approval for password retrieval, correlation with ticketing systems, one-time passwords, and password replacement, as well as others. Thus, the authentication and management server 102 may be operable to support and enforce organizational policies and a variety of procedures for network security and access control. In some embodiments, authentication and management server 102 may be, for example, a system commercially available, such as a Privileged Session Manager®, On-Demand Privileges Manager™ or other system by CyberArk® Software Ltd., assignee of this application.

The policy may take into account a single characteristic or a combination of characteristics relating to the computer devices 101, network accounts, or users. For example, the policy may be based on features such as a username, computer name, IP address, MAC address, identification of an application being run (or previously run) on a computer device 101, identification of a computer to be accessed by the network account, geographic location information associated with a computer device 101, time of day, detected patterns of activity of the network account, results of a security (e.g., virus or malware) scan on computer device 101, or various other attributes of computer device 101, network account, or user that may be detected. In some embodiments, these attributes may be compared against a black/white (i.e., block/allow) list to determine whether the policy should permit granting privileged on-demand membership. In further embodiments, the policy is more sophisticated, and certain combinations of attributes may determine that the policy should permit granting privileged on-demand membership, while other combinations should not. Variations are also possible, where certain attributes are weighted more heavily than others, and privileged on-demand membership is only granted if the sum of the weights of the attributes surpasses a specific threshold. As an example, attributes of an allowable user name, allowable IP address, and allowable geographic location may all support granting privileged on-demand membership. But if it is determined that the network account recently engaged in an unusual pattern of network activity (e.g., connecting to network resources that are rarely used, or are associated with suspected malicious activity in a network), that may outweigh the attributes that support granting privileged on-demand membership, and thus result in a denial of privileged on-demand membership. In such embodiments, machine learning or artificial intelligence may be used to determine what patterns of network activity are normal, are normal for particular users, or are normal for particular categories of users. Conversely, machine learning and artificial intelligence may also identify what patterns of network activity are unusual generally, unusual for individual users, or unusual for particular categories of users.

Further, in some embodiments, a policy may take into account other factors, such as the identity or reputation of a network within which the computer device 101 requests access to a resource. For example, if the request from computer device is received from a known network, or other trusted network or network of a known trusted reputation, the policy may determine a weight to the request that may favor authentication. In some embodiments, a reputation of an unknown network may be determined based on an external network reputation system, for example. Additionally, in some embodiments, a policy may take into account whether a session for accessing a privileged resource includes a managed session, such as one that is isolated, controlled, and/or monitored, such as by a Privileged Session Manager® (PSM) by CyberArk® Software Ltd. For example, a policy may provide a weight favoring authentication if the session is implemented via CyberArk's PSM. A policy according to the disclosed embodiments may consider numerous other attributes or characteristics of a user, computer, application, location, network, authentication protocol, etc.

Further, policies may account for known attack vectors in computer networks. Known attack vectors may be identified based on identifications of prior malicious activity in a computer network (e.g., specific communications, or sequences, by which attackers have attempted to breach a network or attack a machine). Further known attack vectors may be based on projections of how hypothetical attackers may seek to breach a network. Moreover, known attack vectors may be based on use of "decoys" in networks, where computer resources are knowingly made vulnerable or available to potential attackers, yet identifiable, so that if an attacker attempts a breach using the decoy (e.g., a known account, computer device, or access credential), the attempt may be identified and responded to. For each of these types of known attack vectors, the policy described above and implemented on the authentication and management server 102 may be configured to deny granting privileged on-demand membership to a network account if the network account is associated with a known attack vector.

In further embodiments, the policy implemented by the authentication and management server 102 may account for the sensitive nature of the privileged resource to which the network account seeks access. For example, some privileged resources may be more sensitive than others, and thus may require a higher degree of confidence that the network account is legitimate before privileged on-demand membership is granted to the network account. As an example, if a network account has an approved IP address and geographic location, that may be sufficient for accessing a privileged payroll database on a read-only basis. But if the network account wants to access the privileged payroll database on a read-and-write (e.g., administrator) basis, the policy may dictate that these two attributes of the network account are insufficient to grant the network account privileged on-demand membership. By contrast, if the network account has an approved IP address and geographic location, and also has a user name that is approved and a network communications history that is determined to not be associated with actual or suspected malicious activity, the policy may grant the network account read-and-write access to the privileged payroll database.

Further, in some embodiments the policy accounts for both an authentication protocol and attributes of the computer device 101, network account, or user. For example, some forms of authentication may be deemed more reliable or effective than others (e.g., biometric authentication is more deemed more reliable than a password, or multi-factor authentication is deemed more reliable than single-factor authentication). In some embodiments, therefore, the form of authentication that is used may determine whether the policy will grant privileged on-demand membership, or what level of privileged on-demand membership it will grant. As an example, if a user is authenticated with a password, that may be sufficient under the policy for granting privileged on-demand membership to access a cloud orchestration platform in a network, but not sufficient for accessing the cloud orchestration platform as an administrator. Instead, under the policy, if the user is authenticated based on two-factors (e.g., a password and behavioral information), the user may be able to access the cloud orchestration platform as an administrator. In some embodiments, the policy may also require or consider a weight to be applied for an additional second factor authentication based on approval or authorization granted by another authorized user in the network.

In further embodiments, there may be a plurality of different classes or categories of privileged on-demand membership, with each class or category allowing access to different classes or categories of privileged resources. In accordance with the above discussion, the authentication and policy enforcement analysis may determine what class or category of privileged access to grant through privileged on-demand membership. In some embodiments, information in an access token associated with a process invoked using a network account may also influence what class or category of privileged on-demand membership a network account receives. As discussed further in connection with FIG. 6, an access token (e.g., Microsoft Windows™ access token, or access token associated with Apple™ or Linux operating systems) may have various different fields that specify the groups in which the network account is a member. In some embodiments, membership in certain groups (e.g., an administrator's group, local computer group, or another restricted group) may entitle the network account to greater privileged on-demand membership than they would otherwise have without such membership.

Privileged resources 103 may be various types of access-controlled resources in network 104. As discussed above, privileged resources 103 may be any network resource to which access is limited, such as through a requirement that some privileged credential (e.g., password, SSH key, asymmetric (e.g., public/private) key, or other type of cryptographic data or privileged access token) be provided and verified before access to the privileged resource is permitted. Examples of privileged resources include SQL servers, databases holding confidential information, restricted-use applications, operating system directory services (e.g., Microsoft Active Directory™) access-restricted cloud-computing resources (e.g., orchestrator software), sensitive IoT equipment (e.g., electricity or other utility equipment, physical access control devices, video surveillance equipment, etc.), and any other computer-based equipment or software accessible to a limited group of users on a network.

As discussed further below, authentication and management server 102 may be configured to assign privileged on-demand membership for network accounts (e.g., associated with computer devices 101) so that the network accounts can temporarily access privileged resources 103. This may involve, for example, adding a network account to a domain/local security group of the particular privileged resource 103 it is seeking to access. For example, if the privileged resource 103 to which the network account seeks access is an SQL server, the SQL server may maintain a domain/local security group that identifies network accounts that have elevated (e.g., administrator) privileges. If the network account seeking access to the SQL server is a regular, non-privileged account, it will not be a member of the domain/local security group and thus will be unable to access the SQL server (or will be unable to access the SQL server with elevated privileges, and instead will have limited access rights). If the network account is added to the domain/local security group of the SQL server, however, it may thereby be able to access the SQL server with elevated (e.g., administrator) privileges.

Further, in some embodiments, assigning privileged on-demand membership by the authentication and management server 102 may involve modifying an access token or security object (e.g., Microsoft™ access token, or a similar access token used in Apple™ or Linux environments) associated with a process (e.g. instance or launched executable) invoked using the network account to access a resource. For example, an access token associated with the process may have several different fields identifying groups in which the network account is a member. A Microsoft™ access token, for instance, uses one or more security identifiers (SIDs) to indicate the groups in which the network account is a member. A group may be associated with a network-wide group, or additionally or alternatively may correspond to a local computer group. Certain groups may be limited to particular users or types of users (e.g., administrators). When a non-privileged user attempts to access a privileged resource, they may be unable to do so, for example, because they are not a member of a SID corresponding to that privileged resource. Nevertheless, in some embodiments, the authentication and management server 102 may modify the access token for a process to make the network account invoking the process a member of the necessary security group. This may involve modifying the SID group memberships in the access token for the process, or other attributes of the access token, as discussed further in connection with FIG. 6 below. In accordance with the above embodiments, the authentication and management server 102 may modify attributes of the access token conditional on authentication of the computer device 101, network account, or user, and/or conditional on a policy maintained for regulating access to privileged resources 103. Thus, if the authentication and/or policy do not allow the network account access to a privileged resource 103, the authentication and management server 102 may decide not to modify the access token associated with the network account invoking the process.

The authentication and management server 102 may interact with the computer devices 101 and privileged resources 103 in different flows or sequences. For example, authentication and management server 102 may be configured to automatically intercept requests from computer devices 101 for access to privileged resources 103. Thus, before such requests can reach privileged resources 103, they are received at authentication and management server 102, where the appropriate authentication and/or policy enforcement may occur. In embodiments where authentication and management server 102 modifies an access token for a process associated with a network account of a computer device 101, it may also intercept the access token before it reaches a privileged resource 103. In further embodiments, authentication and management server 102 may identify requests for access to privileged resources 103 after they have been received at privileged resources 103. This may occur, for example, based on a notification that a privileged resource 103 sends to authentication and management server 102, or based on authentication and management server 102 intercepting a message (e.g., access denied message) from a privileged resource 103 before it can reach a computer device 101. In such embodiments, authentication and management server 102 may receive the access token for a process associated with the network account either directly from the computer device 101 or the accessed privileged resource 103. Whether authentication and management server 102 intercepts a request for access to a privileged resource 103 before, or after, it reaches the privileged resource 103, authentication and management server 102 may perform the authentication, policy enforcement, and/or privileged on-demand membership elevation, as discussed above.

In further embodiments, authentication and management server 102 grants privileged on-demand membership to a network account by opening a remote session with a network account. A remote session connection may be established between authentication and management server 102 and a computer device 101 through several techniques, such as Microsoft's Remote Desktop Connection (RDC)™ or Remote Desktop Services (RDS)™, Microsoft's Remote Desktop Protocol (RDP)™, VNC™, Apple Remote Desktop™, and others. In such embodiments, authentication and management server 102 itself may have privileged membership sufficient to access a privileged resource 103 (e.g., administrator or root access rights), and thus may be able to establish a session with the privileged resource 103 that it makes available to the computer device 101 via the remote session. This technique also permits a network account associated with a computer device 101 to access a privileged resource 103 without requiring the network account to have privileged credentials or a privileged account. In further embodiments, authentication and management server 102 may run an application hosted by the privileged resource itself, rather than having the application run on the privileged resource. For example, a virtual machine or container on, or associated with, authentication and management server 102 may run the privileged application and transmit a virtualized version of the running application to computer device 101. This technique also allows a network account associated with computer device 101 to access the privileged application without requiring privileged access credentials being stored on, or transmitted from, the network account. Further, when the remote session has ended, there is no trace left on computer device 101 of an access credential or other privileged information associated with accessing the privileged application.

Network 104 may be an on-premises network (e.g., local area network), a cloud network (e.g., private cloud, public cloud, or hybrid cloud network), or a combination of these types of networks. Although FIG. 1 depicts computer devices 101 as separate from the network 104 in which authentication and management server 102 and privileged resources 103 are located, in certain embodiments all of these devices are located in the same network, each is located in a different network, or they are located in overlapping networks.

The system configuration illustrated in FIG. 1 is an example configuration depicting general aspects of the disclosed embodiments. A discussion of techniques and processes for verifying the validity of the cloud-based asset and/or the virtualization platform deploying the cloud-based asset follows with respect to FIGS. 4-5. While certain aspects of the techniques refer to the elements shown in FIG. 1, the disclosed processes are not limited to the particular configuration illustrated in FIG. 1. While various modifications to the general configuration of system 100 are detailed in this disclosure, other modifications are contemplated even if not specifically described. It is noted, for example, that the general principles of the disclosed embodiments are not tied to any specific infrastructure: they may be performed on any computer, server or service, on any infrastructure, on premise, distributed among different infrastructures, and in any cloud. The disclosed systems are operable within any cloud technology and implementation, known and yet to be known in the art.

Figure 2:
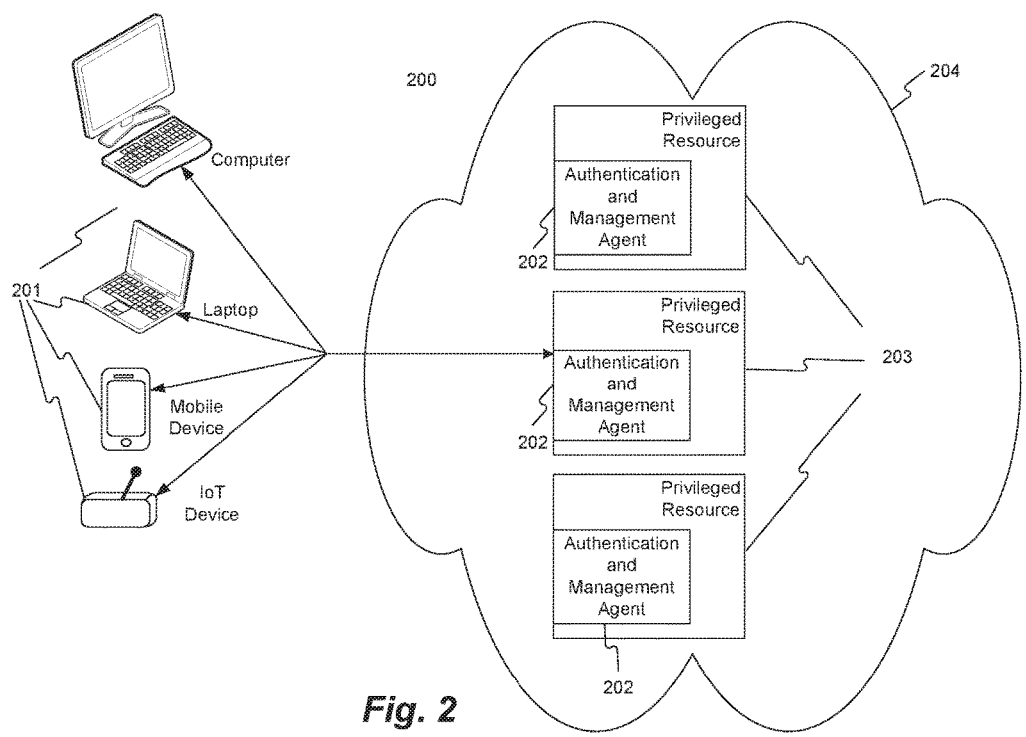
FIG. 2 is a block diagram of another example system, in accordance with disclosed embodiments.

FIG. 2 illustrates another example system 200 for dynamically managing privileged access for non-privileged accounts. In FIG. 2, computer devices 201 may be similar to computer devices 101 described above in connection with FIG. 1. Further, privileged resources 203 may be similar to privileged resources 103 discussed above regarding system 100. Further, network 204 may have various different configurations, as described above in connection with network 104.

In contrast to system 100, however, system 200 includes a plurality of authentication and management agents 202 installed on privileged resources 203. Authentication and management agents 202 may be integrated into applications running on privileged resources 203, or may run as a standalone application on privileged resources 203. In general, authentication and management agents 202 may perform the same functions as authentication and management server 102 in system 100. These functions, as discussed above, may include authentication of computer devices 201, network accounts, or users, as well as enforcement of a policy governing when to grant privileged on-demand access to network accounts for accessing privileged resources 203. As discussed above in connection with system 100, authentication and management agents 202 may intercept requests from computer devices 201 seeking access to privileged resources 203, or identify such requests after they have reached privileged resources 203.

Figure 3:
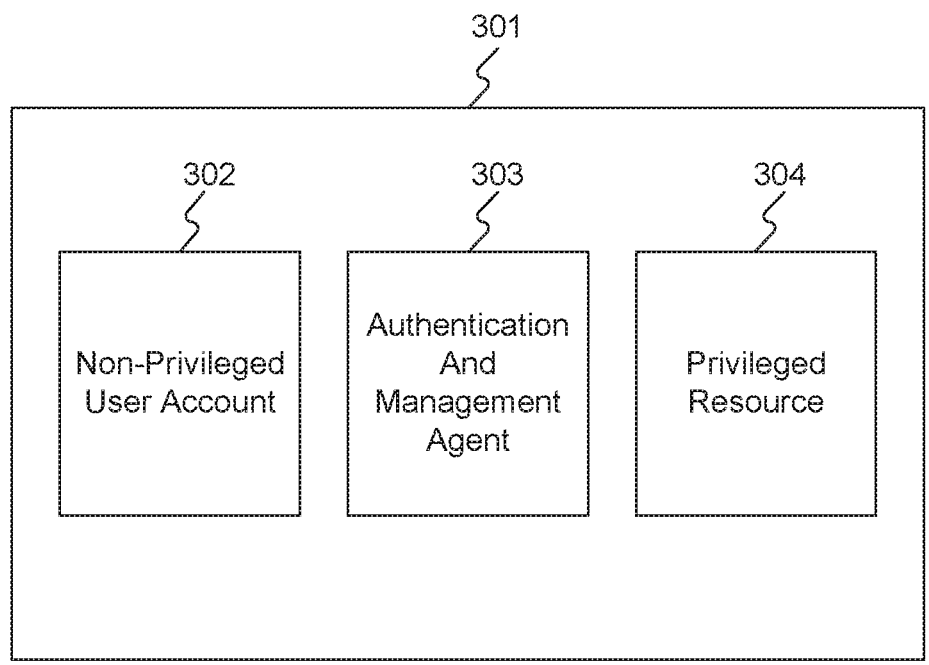
FIG. 3 is a block diagram of a further example system, in accordance with disclosed embodiments.

FIG. 3 illustrates a further example system 300 for dynamically managing privileged access for non-privileged accounts. In FIG. 3, computer device 301 may be similar to computer devices 101 and 201 described above in connection with FIGS. 1-2. Computer device 301 may be associated with one or more user accounts, which may be privileged or non-privileged. As shown in FIG. 3, user account 302 is non-privileged, which means that without a privileged credential or membership in a privileged access group, it cannot access privileged resource 304. User account 302 may correspond to a network account used to access a local resource, such as a locally installed privileged resource 304. For purposes of clarity, but not limitation, only one computer device 301 is shown in FIG. 3. In some embodiments, computer device 301 may include a privileged resource 304 locally installed or stored thereon, which may be similar to privileged resources 103 and 203 discussed above regarding FIGS. 1-2. Further, computer device 301 includes an authentication and management agent 303 as well, which may be similar to authentication and management server 102 and authentication and management agents 202 in FIGS. 1-2. Computer device 301 may also be in a network, such as networks 104 and 204 in FIGS. 1-2.

Unlike systems 100 and 200, system 300 is configured so that the authentication and management agent 303 is running on the computer device 301 itself. In such embodiments, authentication and management agent 303 may perform the same functionality described above in connection with the authentication and management server 102 and authentication and management agents 202 in FIGS. 1-2, namely authentication of computer device 301, a network account associated with computer device 301, or a user associated with computer device 301, as well as policy enforcement governing when to grant privileged on-demand membership sufficient for accessing privileged resource 304. Consistent with the above embodiments, authentication and management agent 303 may intercept requests from non-privileged user account 302 seeking access to privileged resource 304, or may identify such requests after they have reached privileged resource 304. Authentication and management agent 303 may be configured to manage access to privileged resource 304 based on one or more local computer groups identifying privileged access rights for local users. Although in this embodiment authentication and management agent 303 is running on computer device 301 itself, authentication and management agent 303 may also be configured for managing access to other privileged resources on other machines (not shown). For example, authentication and management agent 303 may interact directly with such other machines to grant privileged on-demand membership for user account 302, or it may interact with a separate authentication and management server or agent (not shown) that handles granting such privileged on-demand membership.

Figure 4:
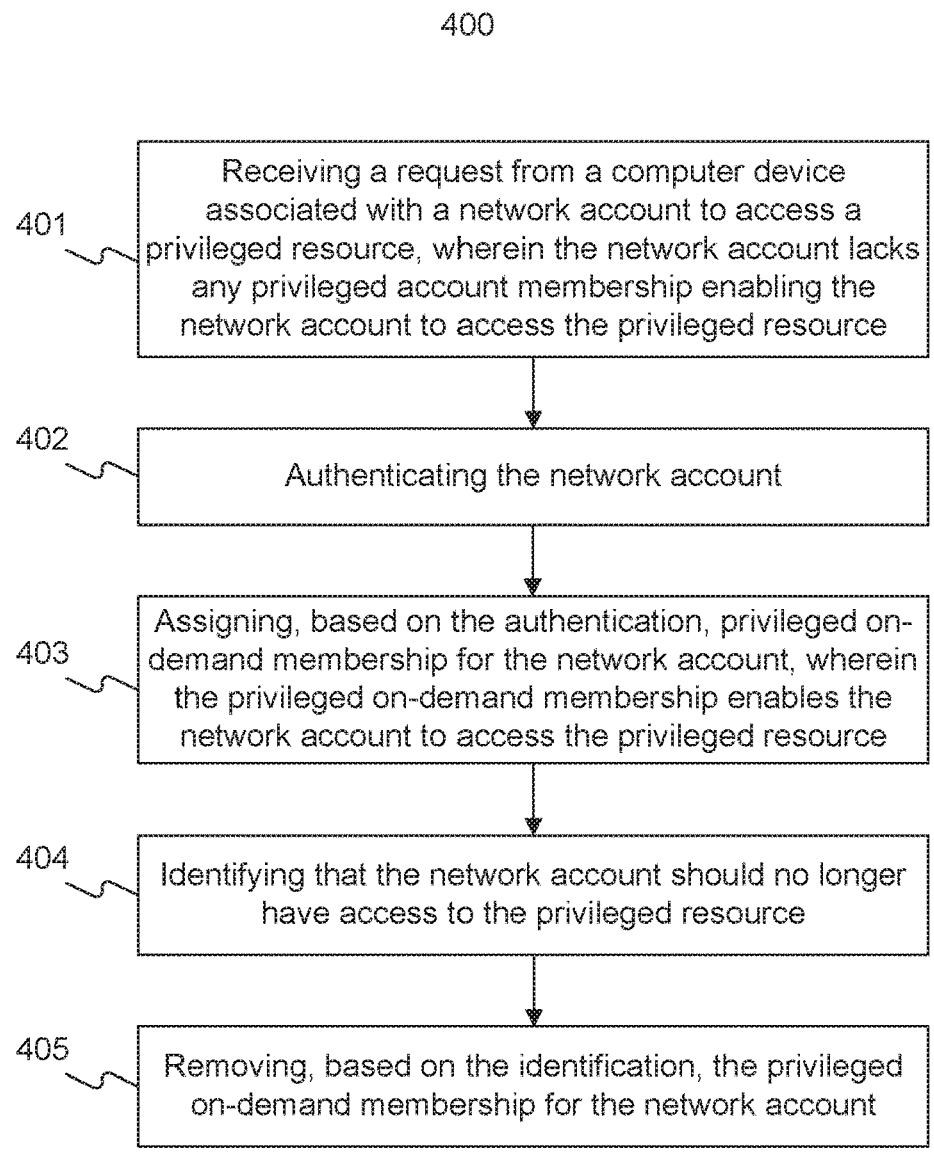
FIG. 4 is a flowchart for an example process for dynamically managing privileged access for non-privileged accounts, consistent with the disclosed embodiments.

FIG. 4 depicts an example process 400 for dynamically managing privileged access for non-privileged accounts. In accordance with the above embodiments, process 400 may be performed in the environments of systems 100, 200, or 300, as well as variations on such systems or combinations thereof.

Process 400 may include an operation 401 of receiving a request from a computer device associated with a network account to access a privileged resource. The request may be received as part of or from a process or instance associated with the network account executed at the computer device. The network account may lack any privileged account membership enabling the network account to access the privileged resource. In accordance with the above embodiments, the computer device may be any one of various types of devices with processing and network communications capabilities, such as computer devices 101, 201, or 301 in FIGS. 1-3. Similarly, the privileged resource may be any one of various types of access-restricted resources, such as privileged resources 103, 203, or 304 in FIGS. 1-3.

The request may be received by an intermediate resource, such as authentication and management server 102 or authentication and management agents 202 or 303 in FIGS. 1-3. Alternatively, the request may be received by the privileged resource itself, such as privileged resource 103, 203, or 304 in FIGS. 1-3, and then forwarded or otherwise reported to authentication and management server 102 or authentication and management agents 202 or 303. In embodiments where authentication is performed, the request (or a separate message) may contain authentication information associated with the computer device, network account, or user. In embodiments where policy enforcement is performed, the request (or a separate message) may contain information used in the policy enforcement evaluation which, as discussed above, can take numerous forms. In embodiments where the policy assessment is based on information from sources other than the computer device, it can be retrieved from another resource (e.g., from network storage maintaining historical information associated with the computer device, or behavioral information, etc.). This information may be retrieved independent of the request (e.g., on a periodic or as-needed basis) or in response to the request.

In embodiments consistent with process 400, the network account may lack any privileged account membership sufficient to access the privileged resource. The network account may be, for example, a regular user account, a guest account, an unknown account, or various other types of non-privileged accounts. In such situations, the network account may be unable to access privileged local resources or privileged network resources, for instance, an access-controlled web development server. Absent the capabilities provided to the network account via process 400, the network account may be unable to access the web development server. It may receive, for example, an "access denied" message if it attempted to access the web development server. Nevertheless, as discussed below, process 400 may potentially provide for such access, depending on authentication and/or policy determinations.

Process 400 may also include an operation 402 of authenticating the network account. The authentication may occur responsive to receiving the request from the computer device, or may occur independent of the request (e.g., upon the network account logging on to the computer device, onto an operating system running on the computer device, or accessing an application on the computer device, etc.). In accordance with the above embodiments, the authentication may be performed by elements of systems 100, 200, and 300, such as authentication and management server 102 and authentication and management agents 202 and 303 in FIGS. 1-3.

As discussed above, the authentication may take various forms, and may relate to the authenticity of the computer device, network account, or user thereof, or combinations of these. The authentication may involve obtaining authentication information such as passwords, SSH keys, asymmetric (e.g., public/private) keys, Kerberos tickets, Docker signed tags, and other types of cryptographic data or privileged access tokens. Further, the authentication may be based on white/black lists for devices or device addresses, or biometric or behavioral information, such as fingerprints, retinal scans, x-rays, biosensors, voice recognition, body movements, walking pace or rhythm, sitting characteristics or patterns, key stroke analysis, and more. Further, the authentication may be single-factor or multi-factor (i.e., a combination of any of the foregoing forms of authentication), and may be performed on the computer device, on a remote authentication server, or through a combination of functionality of both.

Process 400 may also include an operation 403 of assigning, based on the authentication, privileged on-demand membership for the network account, wherein the privileged on-demand membership enables the network account to access the privileged resource. In this operation, if the authentication is unsuccessful, process 400 may determine to not assign privileged on-demand membership for the network account. But if the authentication is successful, it may assign privileged on-demand membership for the network account.

As discussed above, assigning the privileged on-demand membership to the network account may be done in several ways. For example, as discussed above, this may involve temporarily adding the network account to an appropriate domain/local security group on the privileged resource. Further, assigning privileged on-demand membership may involve temporarily modifying an access token (e.g., Microsoft™ access token) or other security object associated with a process invoked using the network account. In accordance with the above embodiments, the assigning of the on-demand membership may be performed by elements of systems 100, 200, and 300, including authentication and management server 102 and authentication and management agents 202 and 303 in FIGS. 1-3. Accordingly, while the network account is unable to access the privileged resource at the time the request for access is submitted, it is able to obtain access upon receiving privileged on-demand membership.

In some embodiments, before privileged on-demand membership is assigned to a network account, a policy is applied to determine whether the privileged on-demand membership should be assigned. As discussed above, the policy may analyze numerous attributes of the computer device, network account, or user, as well as behavioral and machine-learning data associated with other computer devices, network accounts, or users. In some embodiments, consistent with the above disclosure, the policy may be applied following a successful authentication, independent of the authentication, or together with the authentication (e.g., where the authentication information is also used in the policy enforcement determination).

Process 400 may also include an operation 404 of identifying that the network account or process invoked using the network account should no longer have access to the privileged resource. The identification may be made in several ways. In various embodiments, the identification may be made by authentication and management server 102 or authentication and management agents 202 or 303, and may be based on the same policy that was applied to assign the privileged on-demand membership to the network account.

One example of identifying that the network account should no longer have access to the privileged resource is determining the end of a session or process between the network account and the privileged resource. For example, in such a session, the network account may have an associated session ID or session token, which can be stored or exchanged while the session with the privileged resource is ongoing. At the end of the session, the session ID or session token may expire, be invalidated, or be returned to the resource that granted it. Based on the expiration, invalidation, or return of the session ID or session token, it may be determined that the session between the network account and privileged resource has ended, and the privileged on-demand membership should be withdrawn.

As another example, various attributes of the policy responsible for assigning privileged on-demand membership can determine that a network account should no longer have access to the privileged resource. For instance, the policy may limit specific network accounts to having privileged on-demand membership that allows them access to certain privileged resources but not others. If a network account attempts to access a privileged resource that the policy will not allow it to access, that may be a basis for the policy to withdraw any previously granted privileged on-demand membership. In another example, the policy may monitor the network account's activity while accessing a privileged resource. If abnormalities are detected in the activity (e.g., departures from normal or expected activity for the network account, or similar network accounts), that may be a basis for withdrawing the privileged on-demand membership. As a further example, the policy may set a time duration limit, or certain allowable period of time, for the privileged on-demand membership, and when those limits or period are exceeded, the privileged on-demand membership may be withdrawn.

In further embodiments, identifying that the network account should no longer have access to the privileged resource may be based on a command (e.g., from an administrator, or cybersecurity resource) to end the network account's access to the privileged resource. Such a command may be issued, for example, based on detected activity of the network account accessing the privileged resource. While, as discussed above, the policy may analyze such activity, other network entities may also or alternatively monitor the activity of the network account. A network entity may maintain patterns or rules of normal or expected behavior of network accounts, and when a network account deviates from such behavior, a command may be issued to end its access to the privileged resource. Further, if the network entity detects that the network account is associated (directly or indirectly) with suspected malicious activity in a network, that may also trigger issuance of a command to end its access to the privileged resource.

Process 400 may also involve an operation 405 of removing, based on the identification, the privileged on-demand membership for the network account. As discussed above, the identification that the network account should no longer have access to the privileged resource may be based on various different criteria. Once such an identification is received, the privileged on-demand membership for the network account may be withdrawn in several different ways. For example, in the above embodiments where the privileged on-demand membership was assigned by including the network account in a privileged membership group maintained on the privileged resource or another secure network resource, the network account may be deleted or nullified in such a list. Further, in embodiments where privileged on-demand membership is granted by modifying an access token to change the network account's membership in different privileged groups, such modifications may be deleted or changed back, or the access token may be revoked or cancelled. Using these techniques, or others, any privileged on-demand membership that has been assigned to the network account can be reversed, removed, or neutralized.

Figure 5:
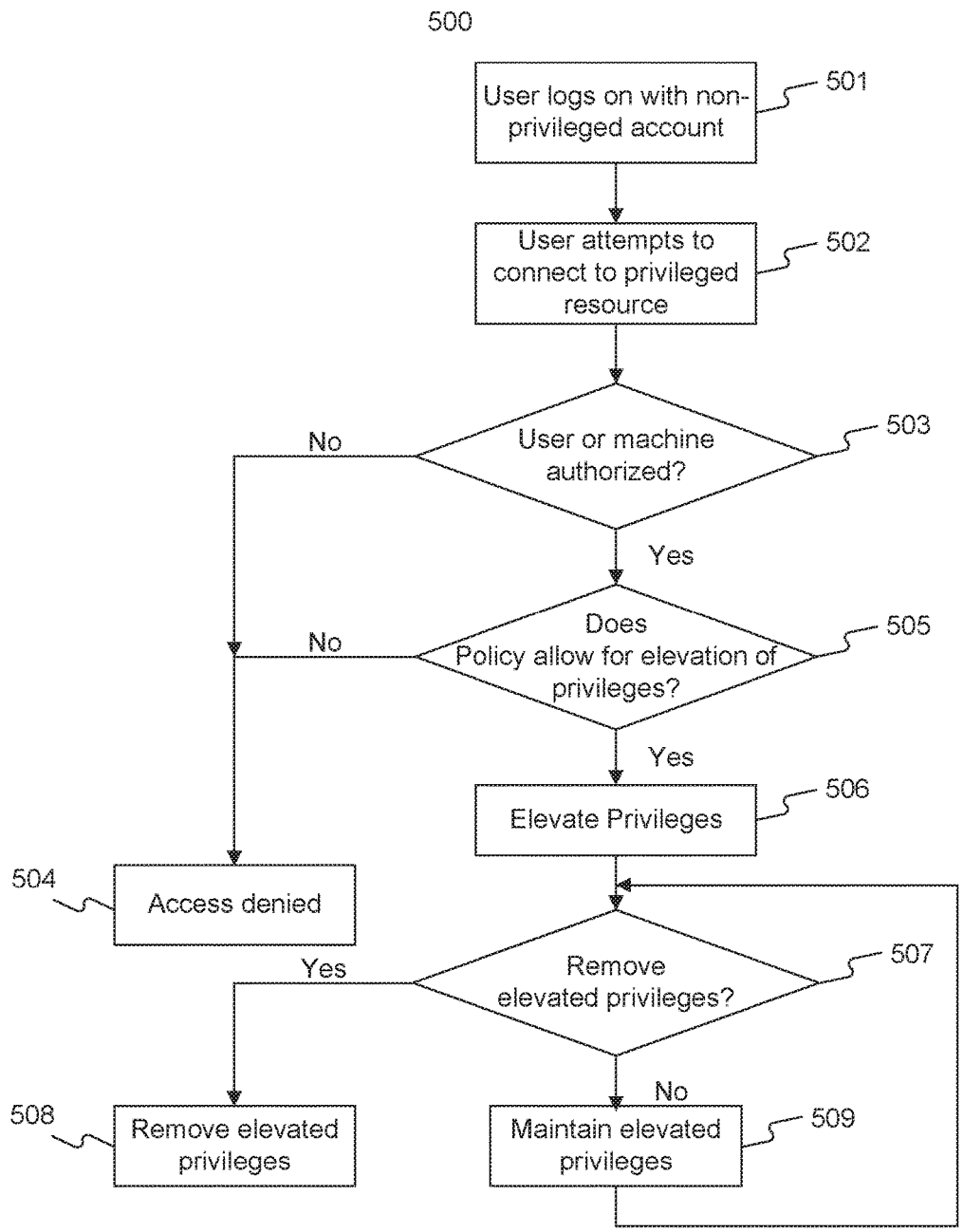
FIG. 5 is a flowchart for an example process for dynamically managing privileged access for non-privileged accounts, consistent with the disclosed embodiments.

FIG. 5 is a flowchart showing an example process 500 for dynamically managing privileged access for non-privileged accounts in accordance with the disclosed embodiments. In process 500, a user may log on to their non-privileged account in operation 501. The account may be, for example, a regular user account, guest account, unknown account, or any other type of account lacking privileges needed for accessing a privileged network resource.

In an operation 502, the network account may attempt to connect to a privileged resource. The connection to a privileged resource may be attempted via a process or instance invoked using the network account, such as by executing a client application using the network account. As discussed above, the privileged resource may be stored on a separate network server or on a local computer device being used by the network account. The attempt to connect to the privileged resource may be a request for a connection transmitted by the computer device (or an application or other process associated with the computer device) and either received at the privileged resource or intercepted by an intermediary network resource before it can reach the privileged resource.

In an operation 503, the system (e.g., using authentication and management server 102 or authentication and management agents 202 and 303 in FIGS. 1-3) may determine whether the computer device, network account, or user is authorized to access the privileged resource. In accordance with the above embodiments, the authentication may be performed in several different ways and use various types of authentication information that is collected from the network account or a separate storage resource. If the authentication is unsuccessful, process 500 may result in denying the network account access to the privileged resource in an operation 504. In embodiments where authentication is not performed, operation 503 may be skipped.

If the authentication is successful, process 500 may continue to operation 505, in which a privileged on-demand membership elevation policy is accessed. The policy, as discussed above, may take into account numerous attributes associated with the network account or other activity in the network. In some embodiments, the policy may also incorporate the results of the authentication in operation 503, where different types of authentication may produce different results under the policy in operation 505. If the policy dictates that the network account should not have access to the privileged resource, process 500 may proceed to operation 504, resulting in a denial of access for the network account.

If the policy assessment dictates that the network account may be granted access to the privileged resource, the system (e.g., using authentication and management server 102 or authentication and management agents 202 and 303 in FIGS. 1-3) may assign privileged on-demand membership to the network account in operation 506. As discussed above, this may be done in various ways, such as by adding the network account to a privileged membership list maintained on the privileged resource or another network resource, or by modifying an access token associated with a process invoked using the network account, such as a token attached to an executable process requesting access to the privileged resource.

In an operation 507, the system (e.g., using authentication and management server 102 or authentication and management agents 202 and 303 in FIGS. 1-3) may determine whether to remove the privileged on-demand membership for the network account. This may involve looking at session IDs or session tokens associated with a session between the network account and privileged resource, activity of the network account, or other activity in the network. If the privileges are to be removed, they may be removed in an operation 508. If they are not to be removed, process 500 may maintain the privileged on-demand membership in operation 509, while optionally cycling back to operation 507 to determine again (e.g., periodically or based on new events) whether the privileged on-demand membership should be removed.

Figure 6:
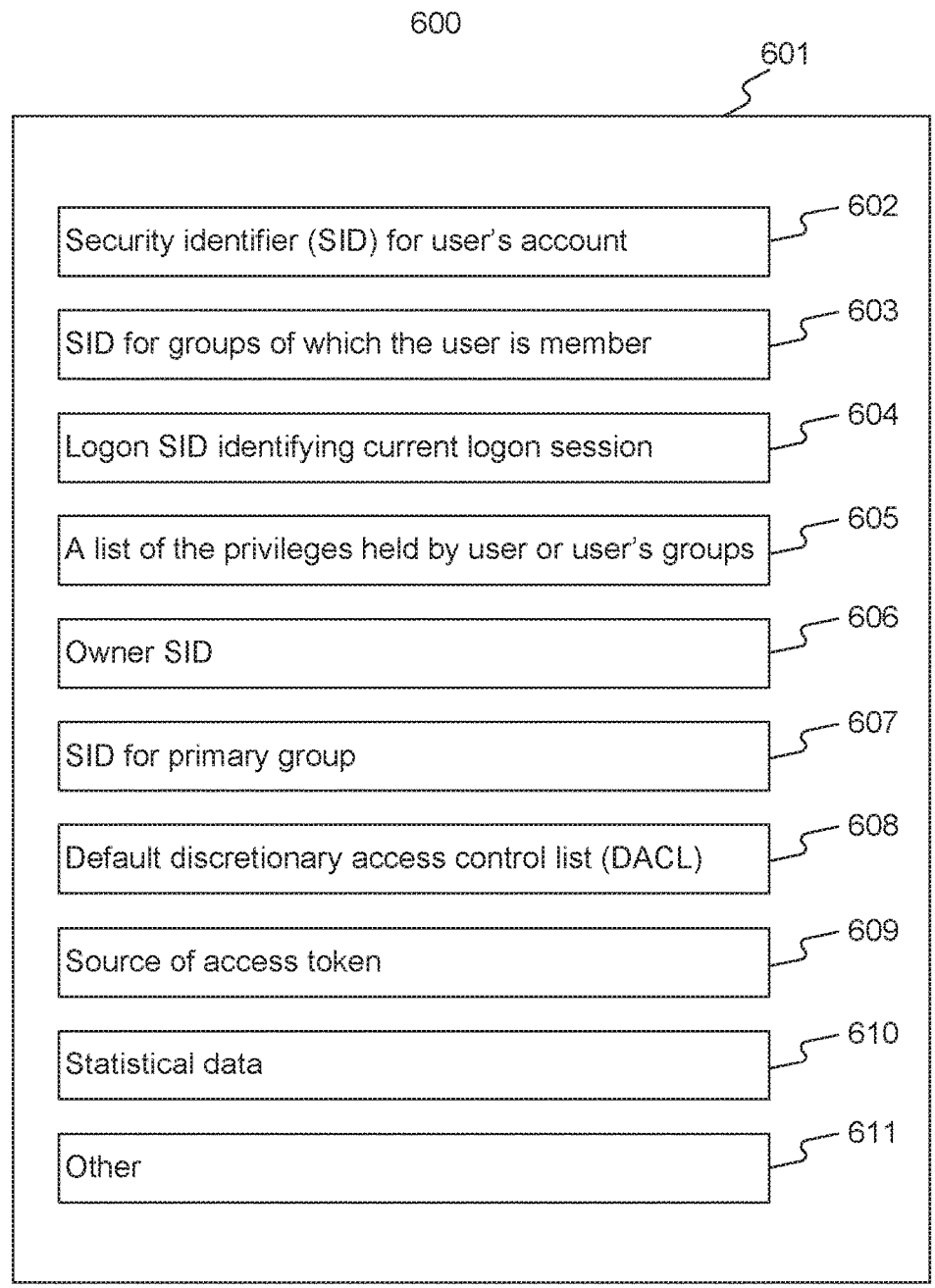
FIG. 6 is a depiction of an example access token, in accordance with disclosed embodiments.

FIG. 6 is an illustration of an example access token 600, in accordance with the disclosed embodiments. As discussed above, access token 600 may be any of various types of access tokens associated with operating systems, such as Microsoft Windows™, Apple™, Linux, and others. Depending on the type of access token, it may have a data structure containing a plurality of fields 601, such as fields 602-611 shown in FIG. 6.

The various fields in access token 600 may include a security identifier (SID) for the user's account 602, SID for groups (network-based or local) of which the user is a member 603, logon SID for identifying a current logon session 604, list of privileges held by the user or the user's groups 605, an owner SID 606, a SID for a primary group 607, a default discretionary access control list (DACL) 608, a source identification for the access token 609, various types of statistical data 610, and various other fields 611. If the network account associated with the access token 600 is non-privileged, its fields (e.g., 602, 603, 605, 607, or 608) may lack any privileged group membership permitting the network account to access a particular privileged resource. Nevertheless, in embodiments where an access token associated with a network account is modified in order to assign privileged on-demand membership to the network account, these fields may be modified in order to grant such privileged group membership. Notably, this may be done transparently to the network account or a user thereof, since their access token may be modified after it has been transmitted from the user's computer device. Moreover, by modifying an access token in this manner to grant privileged on-demand membership, there is no need to store privileged credentials on the user's computer device. Accordingly, the possibility that an attacker may steal or copy such a credential from the user's computer device is minimized.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant authentication protocols, access tokens, network accounts, privileged accounts, privileged resources, computer devices, communication networks, etc. will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A server system for dynamically managing privileged access for non-privileged accounts, the system comprising:
a memory device storing a set of instructions; and
a processor configured to execute the set of instructions to:
receive a request from a computer device associated with a network account to access a privileged resource,
wherein the network account lacks any privileged account membership enabling the network account to access the privileged resource;
wherein the privileged resource is a network resource with limited access; and
wherein the network account is at least one of a user account, machine account, account for an identity, or application account, and is associated with a particular user, machine, or application in a computer network;
responsive to receiving the request from the computer device, authenticate the network account by verifying at least one of a password, cryptographic data, biometric data, or behavioral data with the at least one of the user account, machine account, account for the identity, or application account;

determine that the network account should be assigned privileged on-demand membership using a policy based on at least one of attributes of the computer device, attributes of the network account, attributes of the user, patterns of network activity associated with the network account, or patterns of network activity associated with other network accounts;

responsive to the determination, assign, based on the authentication, a level indicative of a privileged on-demand membership for the network account, wherein the assigning of the level indicative of privileged on-demand membership includes temporarily adding the network account to a domain or local security group on the privileged resource and enables the network account to access the privileged resource;

identify that the network account should no longer have access to the privileged resource; and remove, based on the identification, the privileged on-demand membership for the network account.

2. The system of claim 1, wherein the privileged on-demand membership is assigned by an agent running on a machine hosting the privileged resource.

3. The system of claim 1, wherein the privileged on-demand membership is assigned by an agent running on a machine separate from the privileged resource.

4. The system of claim 1, wherein the assigning of the privileged on-demand membership for the network account is based on a privileged access policy that governs access to the privileged resource.

5. The system of claim 4, wherein the privileged access policy includes privileged access rules based on at least one of a user name associated with the network account, a computer name associated with the computer device, application information associated with the privileged resource, time, and location of the computer device.

6. The system of claim 1, wherein the identification that the network account should no longer have access to the privileged resource is based on the end of a session of the network account.

7. The system of claim 4, wherein the identification that the network account should no longer have access to the privileged resource is based on the privileged access policy.

8. The system of claim 1, wherein the identification that the network account should no longer have access to the privileged resource is based on a command to end the network account's access to the privileged resource.

9. The system of claim 1, wherein the access token identifies an identity and privileges of the network account.

10. The system of claim 1, wherein the access token is modified conditional on the authentication of the network account.

11. The system of claim 1, wherein there are a plurality of different levels of privileged on-demand membership for the privileged resource, and the level assigned for the network account is based on the authentication.

12. The system of claim 4, wherein there are a plurality of different levels of privileged on-demand membership for the privileged resource, and the level assigned for the network account is based on the privileged access policy.

13. The system of claim 1, wherein there are a plurality of different levels of privileged on-demand membership for the privileged resource, and the level assigned for the network account is based on the access token.

14. The system of claim 1, further comprising intercepting the request and assigning the privileged on-demand membership before the request can reach the privileged resource.

15. The system of claim 1, further comprising intercepting the request and assigning the privileged on-demand membership after the request reaches the privileged resource.

16. The system of claim 1, further comprising, before assigning the privileged on-demand membership for the network account, opening a remote virtualized session with the network account.

17. The system of claim 16, wherein the network account is enabled to access the privileged resource through the remote virtualized session.

18. A method for dynamically managing privileged access for non-privileged accounts, the method comprising:

receiving a request from a computer device associated with a network account to access a privileged resource, wherein the network account lacks any privileged account membership enabling the network account to access the privileged resource, and the network account is at least one of a user account, machine account, account for an identity, or application account, and is associated with a particular user, machine, or application in a computer network;

responsive to receiving the request from the computer device, authenticating the network account by verifying at least one of a password, cryptographic data, biometric data, or behavioral data with the at least one of the user account, machine account, account for the identity, or application account;

assigning, based on the authentication, privileged on-demand membership for the network account, wherein the privileged on-demand membership enables the network account to access the privileged resource;

monitoring activity of the network account while the network account accesses the privileged resource using the privileged on-demand membership;

based on the monitored activity, determining that the network account is accessing the privileged resource in an abnormal pattern;

responsive to the determination, identifying that the network account should no longer have access to the privileged resource; and removing, based on the identification, the privileged on-demand membership for the network account.

19. The method of claim 18, wherein the assigning of the privileged on-demand membership for the network account is based on a privileged access policy that governs access to the privileged resource.

20. The method of claim 19, wherein the privileged access policy includes privileged access rules based on at least one of a user name associated with the network account, a computer name associated with the computer device, application information associated with the privileged resource, time, and location of the computer device.

21. The method of claim 18, wherein the identification that the network account should no longer have access to the privileged resource is further based on the end of a session of the network account.

22. The method of claim 19, wherein the identification that the network account should no longer have access to the privileged resource is further based on the privileged access policy.

23. The method of claim 18, wherein the assigning of the privileged on-demand membership for the network account includes modifying an access token associated with the network account.

24. The method of claim 23, wherein the access token identifies an identity and privileges of the network account.

\* \* \* \* \*